United States Patent
Peng et al.

(10) Patent No.: US 7,019,945 B1
(45) Date of Patent: Mar. 28, 2006

(54) AIR BEARING SLIDER INCLUDING PRESSURIZED SIDE PADS WITH FORWARD AND TRAILING SHALLOW ETCHED SURFACES

(75) Inventors: Jih-Ping Peng, Cupertino, CA (US); Ciuter Chang, Fremont, CA (US); Ji-Feng Ying, San Jose, CA (US); Hung-Chang Ward Huang, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 182 days.

(21) Appl. No.: 10/328,610

(22) Filed: Dec. 23, 2002

(51) Int. Cl.
*G11B 5/60* (2006.01)
*G11B 17/32* (2006.01)

(52) U.S. Cl. .............................. 360/235.7; 360/236.1; 360/236.3

(58) Field of Classification Search ................ 360/237, 360/235.7, 236.5, 236.1–236.3, 263.8–236.9
See application file for complete search history.

(56) References Cited

U.S. PATENT DOCUMENTS

| | | | | |
|---|---|---|---|---|
| 5,404,256 A * | 4/1995 | White | ..................... | 360/236.3 |
| 5,473,485 A | 12/1995 | Leung et al. | | |
| 5,999,368 A * | 12/1999 | Katayama | ................ | 360/235.2 |
| 6,021,020 A * | 2/2000 | Itoh et al. | ................ | 360/236.1 |
| 6,424,494 B1 * | 7/2002 | Koishi | ..................... | 360/235.6 |
| 6,445,542 B1 * | 9/2002 | Levi et al. | ................ | 360/236.5 |
| 6,462,909 B1 * | 10/2002 | Boutaghou et al. | ...... | 360/235.8 |
| 6,560,071 B1 * | 5/2003 | Chapin et al. | ........... | 360/235.7 |
| 6,587,308 B1 * | 7/2003 | Sannino et al. | .......... | 360/236.3 |
| 6,590,746 B1 * | 7/2003 | Kang et al. | ............... | 360/236.3 |
| 6,594,113 B1 * | 7/2003 | Rao et al. | ................ | 360/235.8 |
| 6,639,756 B1 * | 10/2003 | Ueda et al. | ............. | 360/235.8 |
| 6,646,831 B1 * | 11/2003 | Takagi et al. | ............. | 360/234.3 |
| 6,661,611 B1 * | 12/2003 | Sannino et al. | .......... | 360/236.3 |
| 6,710,976 B1 * | 3/2004 | Chapin et al. | ........... | 360/235.8 |
| 6,747,847 B1 * | 6/2004 | Stoebe et al. | ............ | 360/235.8 |
| 6,771,468 B1 * | 8/2004 | Levi et al. | ................ | 360/235.5 |
| 6,891,699 B1 * | 5/2005 | Kameyama et al. | ..... | 360/235.7 |
| 2002/0075599 A1 * | 6/2002 | Rao et al. | ................ | 360/235.7 |

\* cited by examiner

*Primary Examiner*—Brian E. Miller
(74) *Attorney, Agent, or Firm*—Stetina Brunda Garred & Brucker

(57) ABSTRACT

An aspect of the invention can be regarded an air bearing slider for use in a disk drive including a rotatable magnetic disk. The slider includes a leading side and a trailing side. The slider further includes opposing lateral sides extending between the leading and trailing sides. The slider further includes a transducer pad disposed adjacent the trailing side. The transducer pad includes a transducer for reading and writing data from and to the magnetic disk. The slider further includes a pair of pressurized side pads each respectively disposed laterally between the transducer pad and a respective one of the lateral sides. Each side pad includes a forward shallow etched surface, a trailing shallow etched surface extending from adjacent the trailing side toward the leading side, and a side pad air bearing surface disposed between and above the forward and trailing shallow etched surfaces.

30 Claims, 4 Drawing Sheets

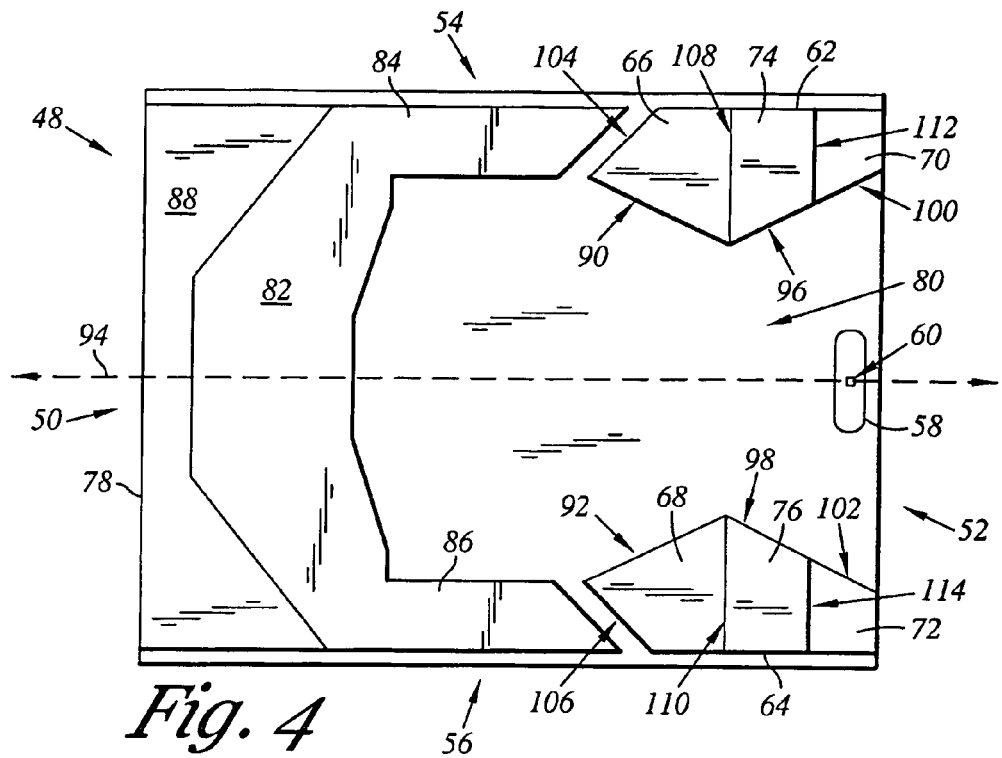
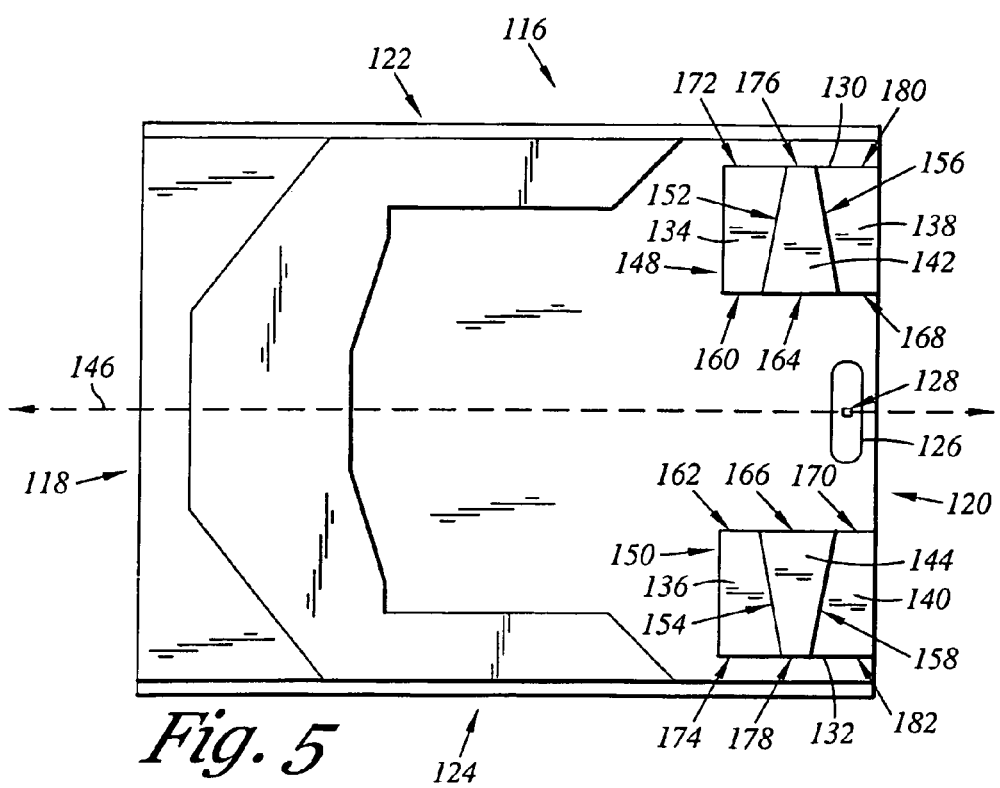

AIR BEARING SLIDER INCLUDING PRESSURIZED SIDE PADS WITH FORWARD AND TRAILING SHALLOW ETCHED SURFACES

CROSS-REFERENCE TO RELATED APPLICATIONS

Not applicable.

BACKGROUND OF THE INVENTION

1. Field of the Invention

The present invention relates generally to a disk drive including an air bearing slider including pressurized side pads with forward and trailing shallow etched surfaces.

2. Description of the Prior Art

The typical hard disk drive includes a head disk assembly (HDA) and a printed circuit board assembly (PCBA) attached to a disk drive base of the HDA. The head disk assembly includes at least one magnetic disk, a spindle motor for rotating the disk, and a head stack assembly (HSA). The spindle motor includes a spindle motor hub that is rotatably attached to the disk drive base. The hub has an outer hub flange that supports a lowermost disk. Additional disks may be stacked and separated with annular disk spacers that are disposed about the hub. The head stack assembly has an actuator assembly including at least one air bearing slider or head, typically several, for reading and writing data to and from the disk. Each air bearing slider includes a magnetic transducer. An example of a slider is disclosed in U.S. Pat. No. 5,473,485 (incorporated herein by reference) that describes a tri-pad slider where a center pad contains a transducer. The printed circuit board assembly includes a servo control system in the form of a disk controller for generating servo control signals. The head stack assembly is controllably positioned in response to the generated servo control signals from the disk controller. In so doing, the attached heads are moved relative to tracks disposed upon the disk.

The head stack assembly includes an actuator assembly, at least one head gimbal assembly, and a flex circuit cable assembly. A conventional "rotary" or "swing-type" actuator assembly typically includes an actuator body that has a bore and a pivot bearing cartridge engaged within the bore for facilitating the actuator body to rotate between limited positions. The actuator assembly further includes a coil portion that extends from one side of the actuator body to interact with one or more permanent magnets to form a voice coil motor. One or more actuator arms extend from an opposite side of the actuator body. A head gimbal assembly includes an air bearing slider that is attached to a suspension with a gimbal. Head gimbal assemblies are distally attached to each of the actuator arms. The head gimbal assemblies and the flex circuit cable assembly are attached to the actuator assembly.

A problem that arises with such prior art slider designs is that debris in the form of particulate matter and dense fluids, such as lubricants, may tend to accumulate at various locations downstream of the various air bearing surfaces that may be disposed about the slider. This is because the structures supporting the air bearing surfaces may tend to promote a vacuum effect with air expanding immediately downstream of such air bearing surfaces. The accumulated debris negatively impacts the aerodynamic characteristics of the slider because the debris results in a change of the geometry of the slider. In addition, after accumulating, a portion of the debris may become dislodged. In this regard, the accumulation and dislodgement of the debris may be non-symmetrical with respect to the slider further negatively impacting the aerodynamic characteristics of the slider. Moreover, dislodged debris may become attached to the downstream center pad further exasperating the impact to aerodynamic characteristics of the slider. Such changes to the aerodynamic characteristics negatively impact the ability to maintain the slider at the prescribed flying height and introduces instability with regard to pitch and roll control. Accordingly, there is a need in the art for an improved disk drive in comparison to the prior art.

SUMMARY OF THE INVENTION

An aspect of the invention can be regarded as an air bearing slider for use in a disk drive including a rotatable magnetic disk. The slider includes a leading side and a trailing side. The slider further includes opposing lateral sides extending between the leading and trailing sides. The slider further includes a transducer pad disposed adjacent the trailing side. The transducer pad includes a transducer for reading and writing data from and to the magnetic disk. The slider further includes a pair of pressurized side pads each respectively disposed laterally between the transducer pad and a respective one of the lateral sides. Each side pad includes a forward shallow etched surface, a trailing shallow etched surface extending from adjacent the trailing side toward the leading side, and a side pad air bearing surface disposed between and above the forward and trailing shallow etched surfaces.

According to various embodiments, the forward shallow etched surfaces each may include an inner edge disposed towards each other which is slanted with respect to a longitudinal axis of the slider. The trailing shallow etched surfaces each may include an inner edge disposed towards each other which is slanted with respect to a longitudinal axis of the slider. The side pad air bearing surfaces each may include an inner edge disposed towards each other which is slanted with respect to a longitudinal axis of the slider. The forward shallow etched surfaces each may include an outer edge disposed away from each other which is slanted with respect to a longitudinal axis of the slider. The trailing shallow etched surfaces each may include an outer edge disposed away from each other which is slanted with respect to a longitudinal axis of the slider. The side pad air bearing surfaces each may include an outer edge disposed away from each other which is slanted with respect to a longitudinal axis of the slider. The forward shallow etched surfaces may each include a forward edge each respectively disposed towards the leading side. The forward edges each may be angularly disposed with respect to a longitudinal axis of the slider. The forward edges of the forward shallow etched surfaces may be perpendicular with respect to the longitudinal axis of the slider. The side pad air bearing surfaces each may include a forward edge each respectively disposed adjacent the forward shallow etched surfaces. The forward edges each may be angularly disposed with respect to a longitudinal axis of the slider. The forward edges of the side pad air bearing surfaces may be perpendicular with respect to the longitudinal axis of the slider. The side pad air bearing surfaces each may include a trailing edge each respectively disposed adjacent the trailing shallow etched surfaces. The trailing edges each may be angularly disposed with respect to a longitudinal axis of the slider. The trailing edges of the side pad air bearing surfaces may be perpendicular with respect to the longitudinal axis of the slider. The air bearing slider may further include a deep etched portion, and the side pads may extend from the deep etched portion. The trailing shallow etched surfaces may extend from at the trailing side toward the leading side.

According to additional aspects of the present invention, the above-described air bearing slider may be incorporated into a disk drive.

BRIEF DESCRIPTION OF THE DRAWINGS

FIG. 4 is an enlarged plan view of the air bearing slider of FIG. 3;

FIG. 5 is an enlarged plan view of an air bearing slider according to another aspect of the present invention.

DESCRIPTION OF THE PREFERRED EMBODIMENTS

Figure 1:
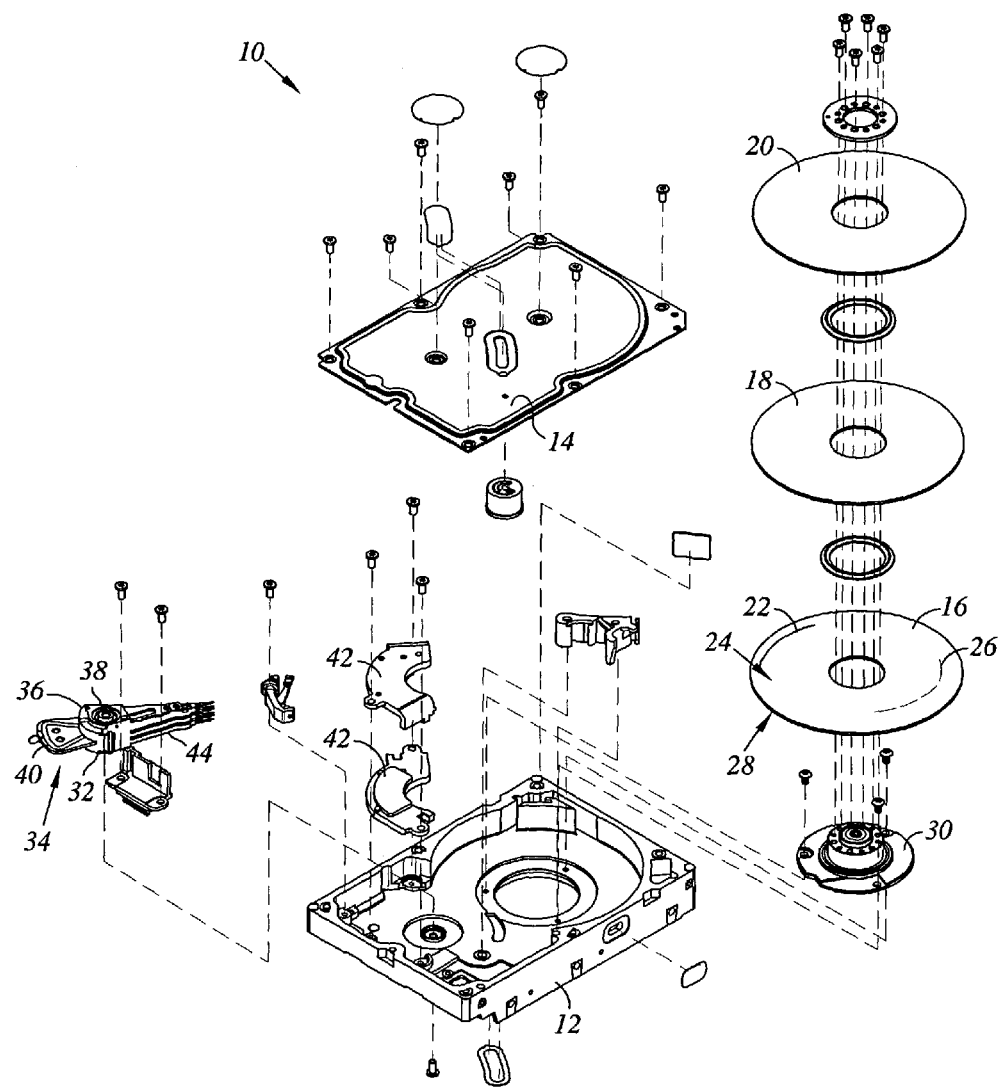
FIG. 1 is an exploded perspective view of a disk drive including air bearing sliders as constructed in accordance with aspects of the present invention.

Referring now to the drawings wherein the showings are for purposes of illustrating preferred embodiments of the present invention only, and not for purposes of limiting the same, FIGS. 1–6 illustrate a disk drive 10 and an air bearing slider embodiment in accordance with the aspects of the present invention.

Referring now to FIG. 1 there is depicted an exploded perspective view of a disk drive 10 constructed in accordance with an aspect of the present invention. The disk drive 10 includes a head disk assembly (HDA) and a printed circuit board assembly (PCBA). The head disk assembly includes a disk drive base 12 and a cover 14 that collectively house magnetic disks 16, 18, 20. The disks 16, 18, 20 each contains a plurality of tracks 22 for storing data. The disks 16, 18, 20 may be two-sided, and thus for example, the disk 16 is shown having a track 22 on an upper facing side 24 and a track 26 (shown in phantom) on a lower facing side 28 (as additionally depicted in FIGS. 2 and 3). The head disk assembly further includes a spindle motor 30 for rotating the disks 16, 18, 20. The head disk assembly further includes a head stack assembly 32 and a pivot bearing cartridge 38.

The head stack assembly 32 includes a rotatable actuator 34 and a plurality of attached head gimbal assemblies. The actuator 34 includes an actuator body 36 that has a bore and the pivot bearing cartridge 38 engaged within the bore for facilitating the actuator body 36 to rotate between limited positions. The actuator 34 further includes a coil portion 40 that extends from one side of the actuator body 36 to interact with a pair of permanent magnets 42 to form a voice coil motor. A plurality of actuator arms, the lowermost one of which being denoted 44, extend from an opposite side of the actuator body 36. As the disks 16, 18, 20 are two sided, each of the actuator arms includes either one or two head gimbal assemblies associated with the adjacent sides of the disks 16, 18, 20.

Figure 2:
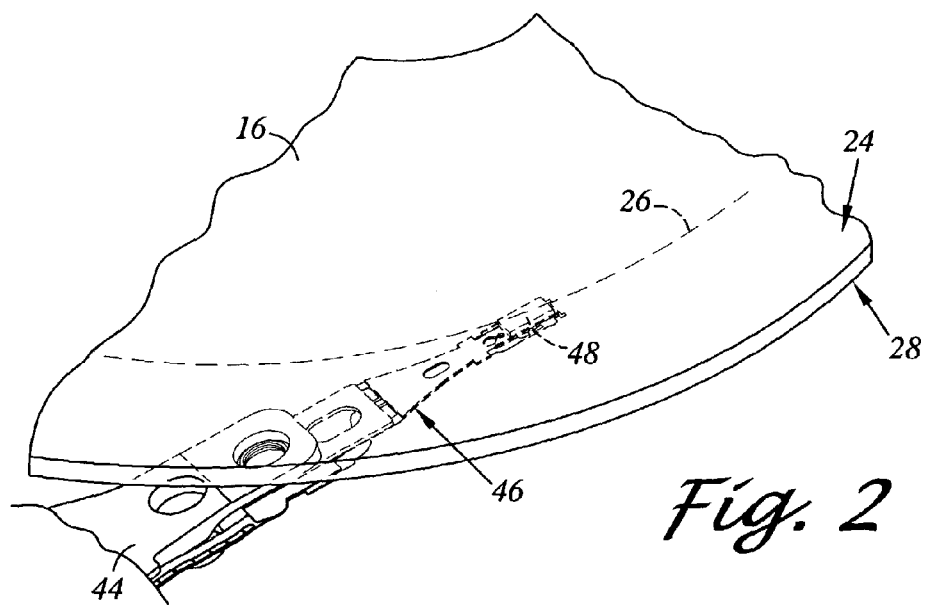
FIG. 2 is an enlarged view of a portion of a magnetic disk shown with a portion of a head gimbal assembly including an air bearing slider as constructed in accordance with aspects of the present invention.
Figure 3:
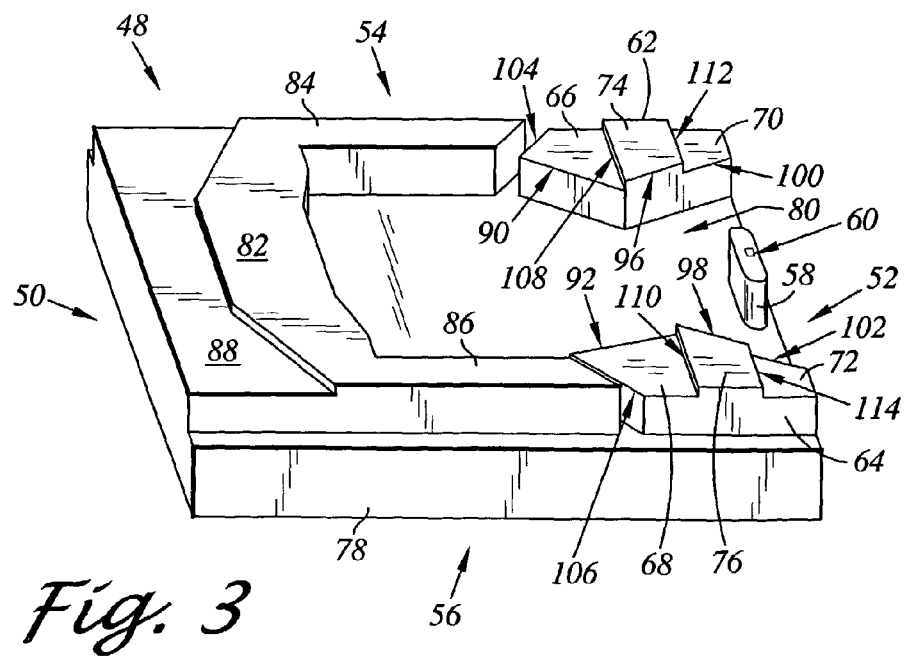
FIG. 3 is a perspective view of an embodiment of an air bearing slider as constructed in accordance with aspects of the present invention.

Referring now to FIG. 2, there is depicted a perspective view of the distal end of the actuator arm 44 shown with a portion of the disk 16. Each of the head gimbal assemblies includes a suspension 46. An air bearing slider 48 of an embodiment of the present invention is attached to the suspension 46 via a gimbal (not shown). FIG. 3 is an enlarged perspective view of the air bearing slider 48 of FIG. 2. The air bearing slider 48 is configured to fly adjacent the lower facing side 28 of the disk 16 for reading and/or writing data from and to the track 24 of the disk 16.

An aspect of the invention can be regarded as the air bearing slider 48 for use in the disk drive 10 including a rotatable magnetic disk, such as disk 16. The slider 48 includes a leading side 50 and a trailing side 52. The slider 48 further includes opposing lateral sides 54, 56 extending between the leading and trailing sides 50, 52. The trailing side 50 includes a trailing edge. The slider 48 further includes a transducer pad 58 disposed adjacent the trailing side 52. The transducer pad 58 includes a transducer 60 for reading and writing data from and to the magnetic disk 16. Suitably, the transducer 60 may include a magneto-resistive ("MR") element, such as a giant magneto-resistive ("GMR") element, for reading data and an inductive element for writing data. The slider 48 further includes a pair of pressurized side pads 62, 64 each respectively disposed laterally between the transducer pad 58 and a respective one of the lateral sides 54, 56. Each of the side pads 62, 64 respectively includes a forward shallow etched surface 66, 68, a trailing shallow etched surface 70, 72 extending from the trailing edge of the trailing side 52 towards the leading side 50, and a side pad air bearing surface 74, 76 disposed between and above the forward and trailing shallow etched surfaces 66, 68 and 70, 72. In this regard, the pressurized side pad 62 includes the side pad air bearing surface 74 disposed between and above the forward shallow etched surface 66 and the trailing shallow etched surface 70. Similarly, the pressurized side pad 64 includes the side pad air bearing surface 76 disposed between and above the forward shallow etched surface 68 and the trailing shallow etched surface 72.

It is contemplated that the forward shallow etched surfaces 66, 68 tend to relatively increase or enhance the pressure adjacent thereto. As such, air flow may be manipulated to be more concentrated towards the longitudinal axis 94 in comparison to a design which does not include such forward shallow etched surfaces 66, 68. Additionally, it is contemplated that the trailing shallow etched surfaces 70, 72 tend to increase or enhance the pressure adjacent thereto. As such, this tends to relatively decrease stagnation of air immediately adjacent the trailing side 52 of the slider 48 at the side pads 62, 64 to thereby mitigate accumulation of debris thereat.

It is contemplated that the relative height of the side pad air bearing surfaces 74, 76 above the forward shallow etched surfaces 66, 68 and the trailing shallow etched surfaces 70, 72 are exaggerated in the figures for discussion purposes. The degree of etching depth of the forward shallow etched surfaces 66, 68 and the trailing shallow etched surfaces 70, 72 below the side pad air bearing surfaces 74, 76 will vary depending upon the particular aerodynamic properties desired.

As mentioned above, the trailing shallow etched surfaces 70, 72 extend from adjacent the trailing side 52. In the embodiment shown, the trailing shallow etched surfaces 70, 72 extend from at the trailing side 52 toward the leading side 50. It is understood that the trailing shallow etched surfaces 70, 72 may be off-set from the trailing side 52 and yet still be adjacent or near the trailing side 52.

According to various embodiments, the slider 48 may include a slider main body 78. The air bearing slider 48 may further include a deep etched portion 80 formed upon the slider main body 78. The pressurized side pads 62, 64 and the transducer pad 58 extend from the deep etched portion 80. The air bearing slider 48 may further include a cross bar 82 and side rails 84, 86 that extend from the deep etched portion 80 and define air bearing surfaces. The cross bar 82 may include a cross bar shallow etched surface 88. Various other configurations and structures for such air bearing surfaces may be chosen from any of those known to one of ordinary skill in the art depending upon desired aerodynamic characteristics. Moreover, although the transducer pad 58 is depicted as being generally centered with respect to the lateral sides 54, 56, the transducer pad 58 may be laterally biased towards either of the lateral sides 54, 56 as desired.

The geometry of the side pads 62, 64 may be of various forms. For example, in the embodiment shown in FIGS. 3 and 4, the forward shallow etched surfaces 66, 68 each includes an inner edge 90, 92 disposed towards each other which is slanted with respect to a longitudinal axis 94 of the slider 48. In this embodiment shown, the inner edges 90, 92 become wider apart towards the leading side 50 of the slider 48. Also, the trailing shallow etched surfaces 70, 72 each may include an inner edge 96, 98 disposed towards each other which is slanted with respect to the longitudinal axis 94 of the slider 48. Further, the side pad air bearing surfaces 74, 76 each may include an inner edge 100, 102 disposed towards each other which is slanted with respect to the longitudinal axis 94 of the slider 48.

As shown, the forward shallow etched surfaces 66, 68 each includes a forward edge 104, 106 each respectively disposed towards the leading side 50. The forward edges 104, 106 each may be angularly disposed with respect to the longitudinal axis 94 of the slider 48. As shown, the forward edges 104, 106 are angularly disposed with respect to the longitudinal axis 94 as well as to an axis perpendicular thereto. Further, the forward edges 104, 106 are disposed with the forward edges 104, 106 facing away from each other. In this embodiment shown, the forward edges 104, 106 become wider apart towards the leading side 50 of the slider 48.

The side pad air bearing surfaces 74, 76 each may include a forward edge 108, 110 each respectively disposed adjacent the forward shallow etched surfaces 66, 68. The forward edges 108, 110 each may be angularly disposed with respect to a longitudinal axis 94 of the slider 48. In this regard, the forward edges 108, 110 of the side pad air bearing surfaces 74, 76 may be perpendicular with respect to the longitudinal axis 94, of the slider 48. Further, the side pad air bearing surfaces 74, 76 each may include a trailing edge 112, 114 each respectively disposed adjacent the trailing shallow etched surfaces 72, 74. The trailing edges 112, 114 each may be angularly disposed with respect to a longitudinal axis 94 of the slider 48. In this regard, the trailing edges 112, 114 of the side pad air bearing surfaces 74, 76 may be perpendicular with respect to the longitudinal axis 94 of the slider 48.

Referring now to FIG. 5, there is depicted a plan view similar to the view of FIG. 4, however depicting an air bearing slider 116 according to another embodiment. The air bearing slider 116 is similar in construction to that of the air bearing slider 48, however, with the differences noted. In this regard, the air bearing slider 116 includes a leading side 118, a trailing side 120, opposing lateral sides 122, 124, and a transducer pad 126 with a transducer 128, which are respectively similar to the leading side 50, the trailing side 52, the opposing lateral sides 54, 56, and the transducer pad 58 with a transducer 60 of the air bearing slider 48.

The slider 116 further includes a pair of pressurized side pads 130, 132 each respectively disposed laterally between the transducer pad 126 and a respective one of the lateral sides 122, 124. Each of the side pads 130, 132 respectively includes a forward shallow etched surface 134, 136, a trailing shallow etched surface 138, 140 extending from adjacent the trailing side 120 toward the leading side 118, and a side pad air bearing surface 142, 144 disposed between and above the forward and trailing shallow etched surfaces 134, 136 and 138, 140. The forward shallow etched surfaces 134, 136 each includes a forward edge 148, 150 disposed towards the leading side 118.

In this embodiment, the forward edges 148, 150 of the forward shallow etched surfaces 134, 136 may be perpendicular with respect to a longitudinal axis 146 of the slider 116. The side pad air bearing surfaces 142, 144 each may include a forward edge 152, 154 each respectively disposed adjacent the forward shallow etched surfaces 134, 136. In this embodiment, the forward edges 152, 154 are angularly disposed with respect to the longitudinal axis 146 of the slider 116 as well as to an axis perpendicular thereto. Further, the forward edges 152, 154 are disposed with the forward edges 152, 154 facing away from each other. In this embodiment shown, the forward edges 152, 154 become wider apart towards the trailing side 120 of the slider 116. The side pad air bearing surfaces 142, 144 each may include a trailing edge 156, 158 each respectively disposed adjacent the trailing shallow etched surfaces 138, 140. In this embodiment, the trailing edges 156, 158 are angularly disposed with respect to the longitudinal axis 146 of the slider 116 as well as to an axis perpendicular thereto. Further, the trailing edges 156, 158 are disposed with the trailing edges 156, 158 facing away from each other. In this embodiment shown, the trailing edges 156, 158 become wider apart towards the leading side 118 of the slider 116.

The forward shallow etched surfaces 134, 136 may each include an inner edge 160, 162 and an outer edge 172, 174. The side pad air bearing surfaces 142, 144 may each include an inner edge 164, 166 and an outer edge 176, 178. The trailing shallow etched surfaces 138, 140 may each include an inner edge 168, 170 and an outer edge 180, 182. In this embodiment, the inner edges 160, 162, the outer edges 172, 174, the inner edges 164, 166, the outer edges 176, 178, the inner edges 168, 170, and the outer edges 180, 182 are disposed parallel to the longitudinal axis 146 of the slider 116.

It is contemplated that while the transitions between the outer edges 172, 174 and the forward edges 148, 150 and the transitions between the forward edges 148, 150 and the inner edges 160, 162 are abrupt, a more gradual or rounded transition may be utilized. In this regard for example, though not shown, the outer edge 172 may be formed to blend into the forward edge 148.

Figure 6:
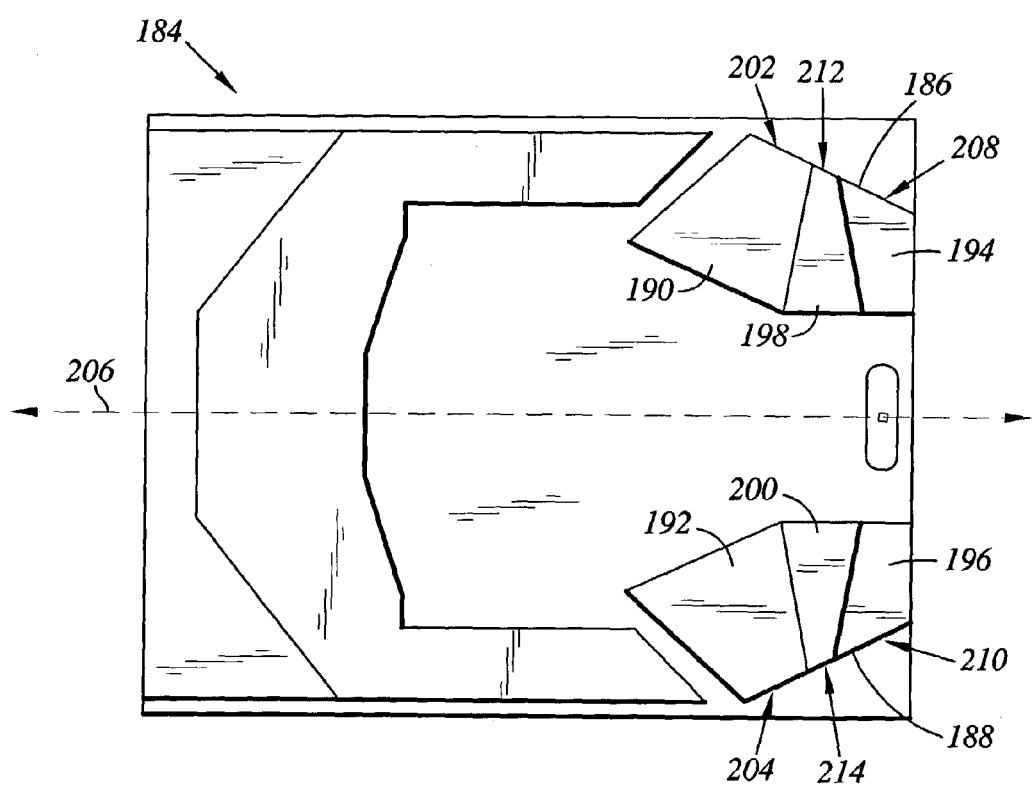
FIG. 6 is an enlarged plan view of an air bearing slider according to another aspect of the present invention.

Referring now to FIG. 6, there is depicted a plan view similar to the view of FIG. 4, however depicting an air bearing slider 184 according to another embodiment. The air bearing slider 184 is similar in construction to that of the air bearing slider 48, however, with the differences noted. In this regard, the air bearing slider 184 includes a pair of pressurized side pads 186, 188. Each of the side pads 186, 188 respectively includes a forward shallow etched surface 190, 192, a trailing shallow etched surface 194, 196, and a side pad air bearing surface 198, 200 disposed between and above the forward and trailing shallow etched surfaces 190, 192 and 194, 196. The forward shallow etched surfaces 190, 192 each includes an outer edge 202, 204 disposed away from each other which is slanted with respect to a longitudinal axis 206 of the slider 184. The trailing shallow etched surfaces 194, 196 each includes an outer edge 208, 210 disposed away from each other which is slanted with respect to the longitudinal axis 206 of the slider 184. The side pad air bearing surfaces 198, 200 each includes an outer edge 212, 214 disposed away from each other which is slanted with respect to a longitudinal axis 206 of the slider 184.

According to additional aspects of the present invention, the above-described air bearing sliders may be incorporated into a disk drive, such as disk drive 10.

What is claimed is:

1. An air bearing slider for use in a disk drive including a rotatable magnetic disk, the slider comprising:
    a leading side and a trailing side, the trailing side including a trailing edge;
    opposing lateral sides extending between the leading and trailing sides;
    a transducer pad disposed adjacent the trailing side, the transducer pad including a transducer for reading and writing data from and to the magnetic disk; and
    a pair of pressurized side pads each respectively disposed laterally between the transducer pad and a respective one of the lateral sides, each side pad including:
        a forward shallow etched surface;
        a trailing shallow etched surface extending from the trailing edge of the trailing side towards the leading side; and
        a side pad air bearing surface disposed between and above the forward and trailing shallow etched surfaces;
    wherein the forward shallow etched surfaces each including an outer edge disposed away from each other which is slanted with respect to a longitudinal axis of the slider.

2. The air bearing slider of claim 1 wherein the forward shallow etched surfaces each include an inner edge disposed towards each other which is slanted with respect to a longitudinal axis of the slider.

3. The air bearing slider of claim 1 wherein the trailing shallow etched surfaces each include an inner edge disposed towards each other which is slanted with respect to a longitudinal axis of the slider.

4. The air bearing slider of claim 1 wherein the side pad air bearing surfaces each include an inner edge disposed towards each other which is slanted with respect to a longitudinal axis of the slider.

5. The air bearing slider of claim 1 wherein the trailing shallow etched surfaces each include an outer edge disposed away from each other which is slanted with respect to a longitudinal axis of the slider.

6. The air bearing slider of claim 1 wherein the side pad air bearing surfaces each include an outer edge disposed away from each other which is slanted with respect to a longitudinal axis of the slider.

7. The air bearing slider of claim 1 wherein the forward shallow etched surfaces each includes a forward edge each respectively disposed towards the leading side, the forward edges are each angularly disposed with respect to a longitudinal axis of the slider.

8. The air bearing slider of claim 7 wherein the forward edges of the forward shallow etched surfaces are perpendicular with respect to the longitudinal axis of the slider.

9. The air bearing slider of claim 1 wherein the side pad air bearing surfaces each include a forward edge each respectively disposed adjacent the forward shallow etched surfaces, the forward edges are each angularly disposed with respect to a longitudinal axis of the slider.

10. The air bearing slider of claim 9 wherein the forward edges of the side pad air bearing surfaces are perpendicular with respect to the longitudinal axis of the slider.

11. The air bearing slider of claim 1 wherein the side pad air bearing surfaces each include a trailing edge each respectively disposed adjacent the trailing shallow etched surfaces, the trailing edges are each angularly disposed with respect to a longitudinal axis of the slider.

12. The air bearing slider of claim 11 wherein the trailing edges of the side pad air bearing surfaces are perpendicular with respect to the longitudinal axis of the slider.

13. The air bearing slider of claim 1 further includes a deep etched portion, the side pads extend from the deep etched portion.

14. A disk drive comprising:
    a disk drive base;
    a magnetic disk rotatably coupled to the disk drive base;
    an air bearing slider comprising:
        a leading side and a trailing side, the trailing side including a trailing edge;
        opposing lateral sides extending between the leading and trailing sides;
        a transducer pad disposed adjacent the trailing side, the transducer pad including a transducer for reading and writing data from and to the magnetic disk; and
        a pair of pressurized side pads each respectively disposed laterally between the transducer pad and a respective one of the lateral sides, each side pad including:
            a forward shallow etched surface;
            a trailing shallow etched surface extending from the trailing edge of the trailing side towards the leading side; and
            a side pad air bearing surface disposed between and above the forward and trailing shallow etched surfaces;
        wherein the forward shallow etched surfaces each including an outer edge disposed away from each other which is slanted with respect to a longitudinal axis of the slider.

15. The disk drive of claim 14 wherein the forward shallow etched surfaces each include an inner edge disposed towards each other which is slanted with respect to a longitudinal axis of the slider.

16. The disk drive of claim 14 wherein the trailing shallow etched surfaces each include an inner edge disposed towards each other which is slanted with respect to a longitudinal axis of the slider.

17. The disk drive of claim 14 wherein the side pad air bearing surfaces each include an inner edge disposed towards each other which is slanted with respect to a longitudinal axis of the slider.

18. The disk drive of claim 14 wherein the trailing shallow etched surfaces each include an outer edge disposed away from each other which is slanted with respect to a longitudinal axis of the slider.

19. The disk drive of claim 14 wherein the side pad air bearing surfaces each include an outer edge disposed away from each other which is slanted with respect to a longitudinal axis of the slider.

20. The disk drive of claim 14 wherein the forward shallow etched surfaces each includes a forward edge each respectively disposed towards the leading side, the forward edges are each angularly disposed with respect to a longitudinal axis of the slider.

21. The disk drive of claim 20 wherein the forward edges of the forward shallow etched surfaces are perpendicular with respect to the longitudinal axis of the slider.

22. The disk drive of claim 14 wherein the side pad air bearing surfaces each include a forward edge each respectively disposed adjacent the forward shallow etched surfaces, the forward edges are each angularly disposed with respect to a longitudinal axis of the slider.

23. The disk drive of claim 22 wherein the forward edges of the side pad air bearing surfaces are perpendicular with respect to the longitudinal axis of the slider.

24. The disk drive of claim 14 wherein the side pad air bearing surfaces each include a trailing edge each respectively disposed adjacent the trailing shallow etched surfaces, the trailing edges are each angularly disposed with respect to a longitudinal axis of the slider.

25. The disk drive of claim 24 wherein the trailing edges of the side pad air bearing surfaces are perpendicular with respect to the longitudinal axis of the slider.

26. The disk drive of claim 14 further includes a deep etched portion, the side pads extend from the deep etched portion.

27. An air bearing slider for use in a disk drive including a rotatable magnetic disk, the slider comprising:
a leading side and a trailing side;
opposing lateral sides extending between the leading and trailing sides;
a transducer pad disposed adjacent the trailing side, the transducer pad including a transducer for reading and writing data from and to the magnetic disk; and
a pair of pressurized side pads each respectively disposed laterally between the transducer pad and a respective one of the lateral sides, each side pad including:
a forward shallow etched surface;
a trailing shallow etched surface extending from adjacent the trailing side towards the leading side; and
a side pad air bearing surface disposed between and above the forward and trailing shallow etched surfaces;
wherein the trailing shallow etched surfaces each include an inner edge disposed towards each other which is slanted with respect to a longitudinal axis of the slider.

28. An air bearing slider for use in a disk drive including a rotatable magnetic disk, the slider comprising:
a leading side and a trailing side;
opposing lateral sides extending between the leading and trailing sides;
a transducer pad disposed adjacent the trailing side, the transducer pad including a transducer for reading and writing data from and to the magnetic disk; and
a pair of pressurized side pads each respectively disposed laterally between the transducer pad and a respective one of the lateral sides, each side pad including:
a forward shallow etched surface;
a trailing shallow etched surface extending from adjacent the trailing side towards the leading side; and
a side pad air bearing surface disposed between and above the forward and trailing shallow etched surfaces;
the trailing shallow etched surfaces each include an outer edge disposed away from each other which is slanted with respect to a longitudinal axis of the slider.

29. A disk drive comprising:
a disk drive base;
a magnetic disk rotatably coupled to the disk drive base;
an air bearing slider comprising:
a leading side and a trailing side;
opposing lateral sides extending between the leading and trailing sides;
a transducer pad disposed adjacent the trailing side, the transducer pad including a transducer for reading and writing data from and to the magnetic disk; and
a pair of pressurized side pads each respectively disposed laterally between the transducer pad and a respective one of the lateral sides, each side pad including:
a forward shallow etched surface;
a trailing shallow etched surface extending from adjacent the trailing side towards the leading side; and
a side pad air bearing surface disposed between and above the forward and trailing shallow etched surfaces;
wherein the trailing shallow etched surfaces each include an inner edge disposed towards each other which is slanted with respect to a longitudinal axis of the slider.

30. A disk drive comprising:
a disk drive base;
a magnetic disk rotatably coupled to the disk drive base;
an air bearing slider comprising:
a leading side and a trailing side;
opposing lateral sides extending between the leading and trailing sides;
a transducer pad disposed adjacent the trailing side, the transducer pad including a transducer for reading and writing data from and to the magnetic disk; and
a pair of pressurized side pads each respectively disposed laterally between the transducer pad and a respective one of the lateral sides, each side pad including:
a forward shallow etched surface;
a trailing shallow etched surface extending from adjacent the trailing side towards the leading side; and
a side pad air bearing surface disposed between and above the forward and trailing shallow etched surfaces;
wherein the trailing shallow etched surfaces each include an outer edge disposed away from each other which is slanted with respect to a longitudinal axis of the slider.

* * * * *